Oct. 4, 1949.   R. L. COTTA   2,483,810
AUTOMATIC HOB SLIDE

Filed Sept. 26, 1945   5 Sheets-Sheet 1

INVENTOR.
Ralph L. Cotta
BY
Carlson, Pitzner, Hubbard & Wolfe
ATTORNEYS

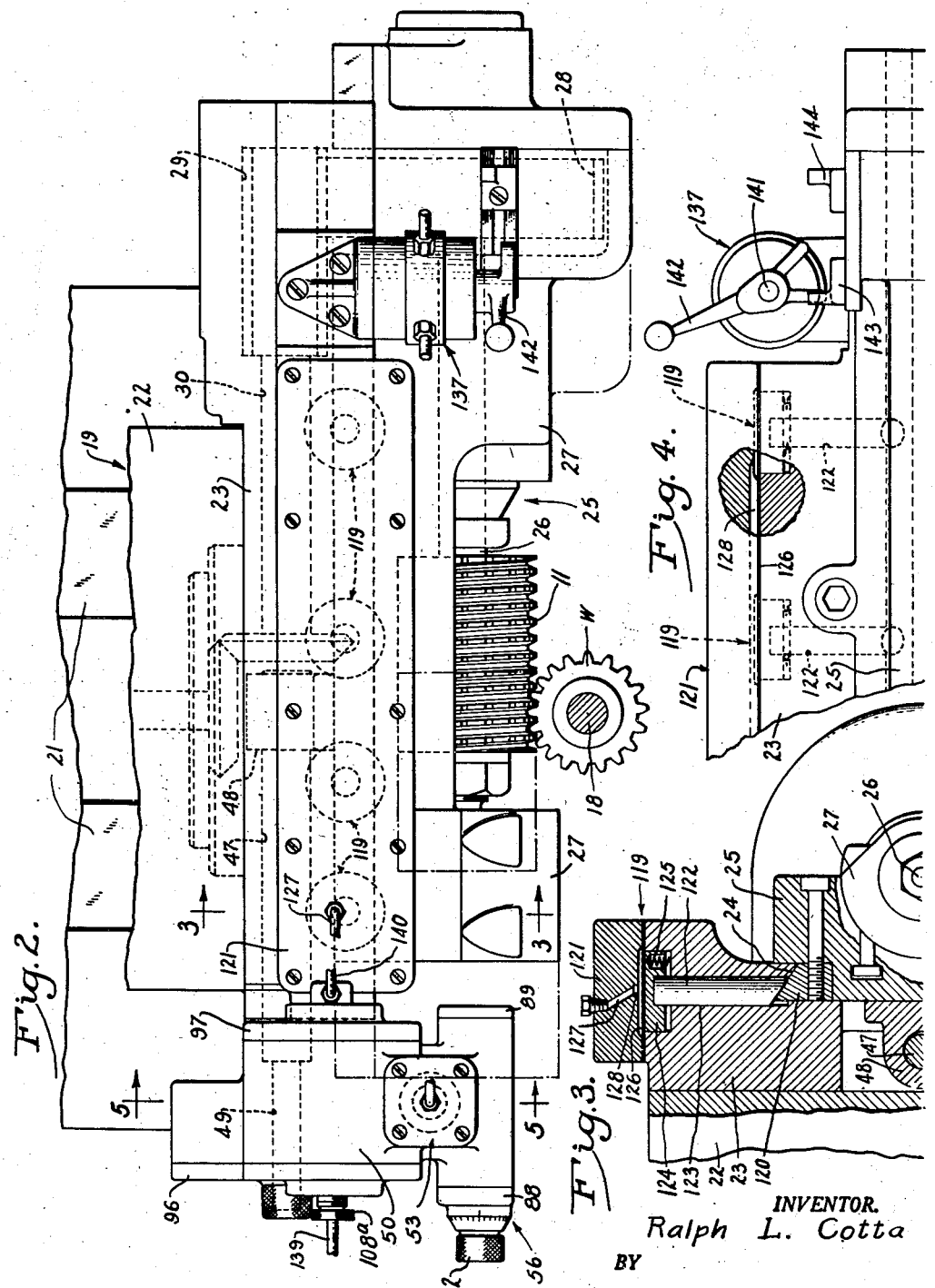

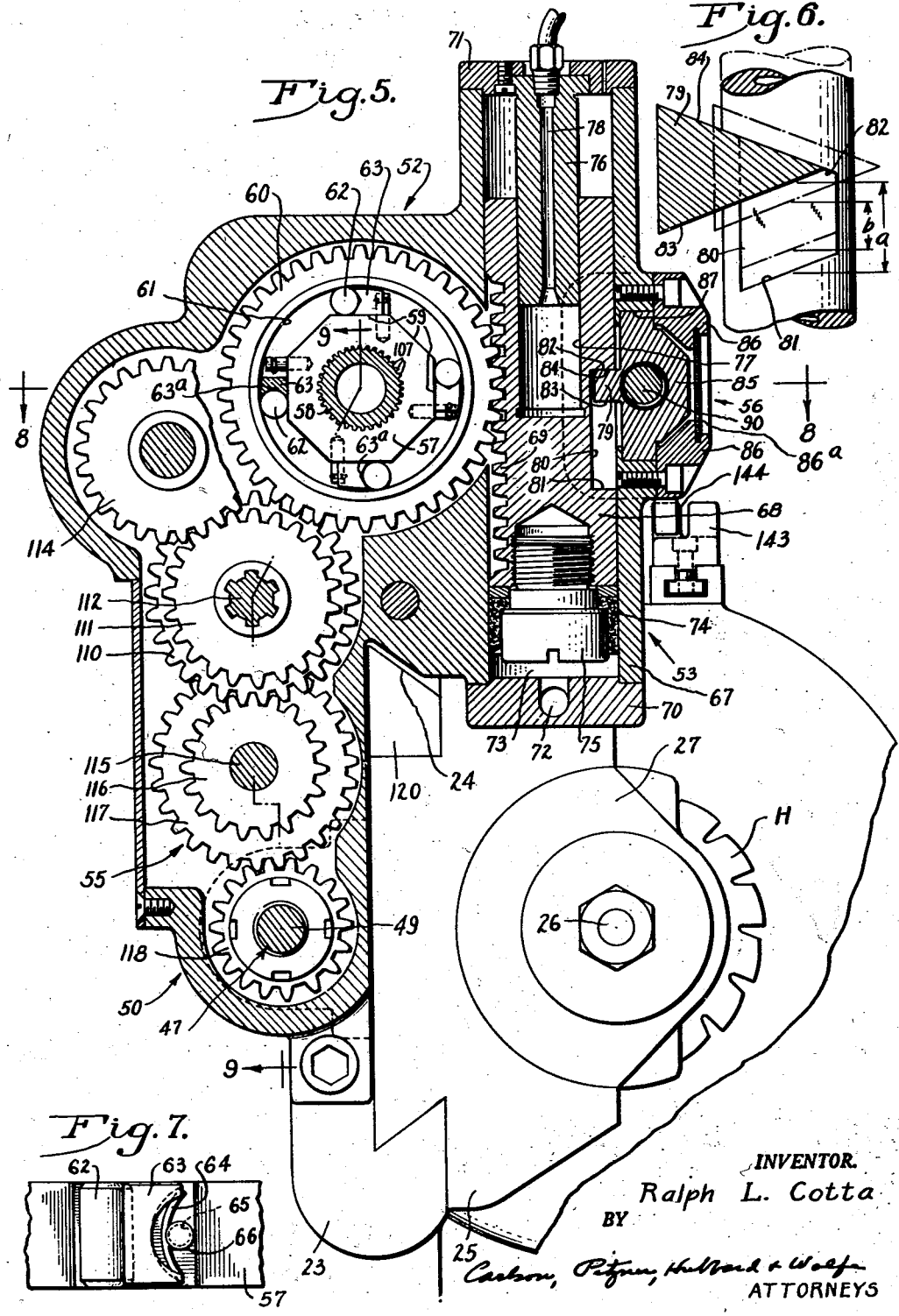

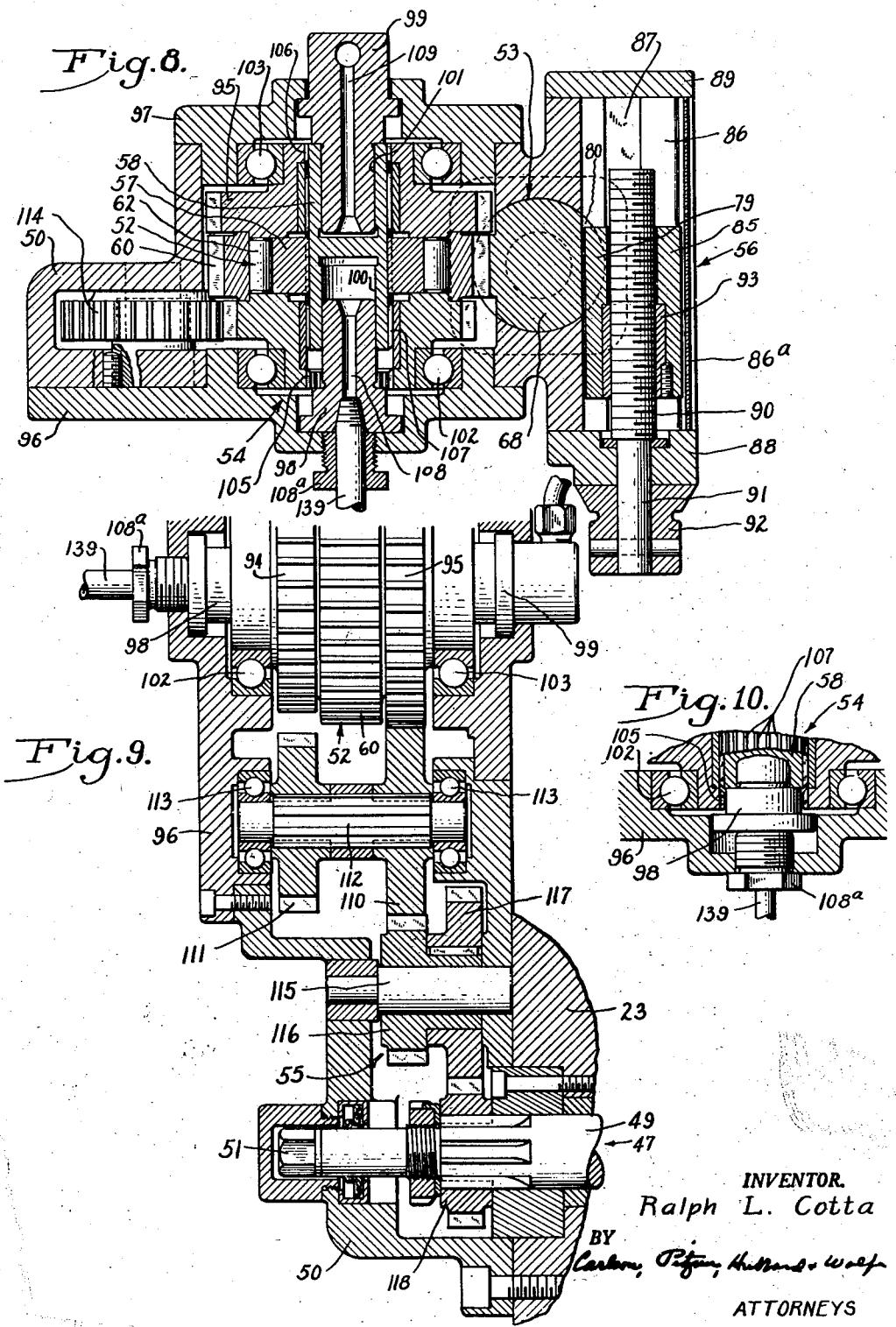

Patented Oct. 4, 1949

2,483,810

UNITED STATES PATENT OFFICE 2,483,810

AUTOMATIC HOB SLIDE

Ralph L. Cotta, Rockford, Ill., assignor to Barber-Colman Company, Rockford, Ill., a corporation of Illinois Application September 26, 1945, Serial No. 618,716

6 Claims. (Cl. 90—4)

The invention relates generally to improvements in hobbing machines for cutting gears, multiple spline shafts and other similar toothed elements, and particularly to a movable support for the tool or work, such as a hob slide, which is automatically adjustable at a predetermined point in the machine cycle to effect an incremental axial shift of the hob relative to the work, whereby different portions of the hob are brought into cutting position in successive machine cycles.

One of the objects of the present invention is to provide a novel shiftable support of the foregoing character in which the extent of the axial shift of the hob relative to the work in each machine cycle is subject to infinite adjustment over a range from zero to maximum.

Another object is to provide a new and improved hob slide of the foregoing character which is simple and compact in construction and efficient and reliable in operation.

A further object is to provide a novel intermittent feed transmission for axially shifting the hob spindle of an automatic hob slide in a succession of steps, the transmission including a reciprocatory actuator, a device for converting the motion of the actuator into intermittent unidirectional rotary motion and a reversing mechanism for transmitting the rotary motion reversibly to a terminal drive shaft, and the elements of the transmission being assembled into a self-contained or unitary attachment adapted to be mounted in operative association with the slide.

Further objects and advantages will become apparent as the description proceeds.

In the accompanying drawings,

Fig. 2 is a fragmentary plan view of the automatic hob spindle slide.

Fig. 3 is a fragmentary vertical sectional view taken along line 3—3 of Fig. 2, and illustrating one of the clamps for the slide.

Fig. 4 is a fragmentary front elevational view of a portion of the slide, and illustrating a direction control mechanism.

Fig. 5 is a transverse vertical sectional view taken substantially along line 5—5 of Fig. 2, and illustrating a drive transmission for shifting the spindle slide incrementally in a direction axially of the hob.

Fig. 6 is a fragmentary detail view of control means for determining the extent of feed movement imparted to the slide in each shift increment.

Fig. 7 is a fragmentary detail view of an overrunning clutch forming part of the drive transmission.

Fig. 8 is a sectional view taken along line 8—8 of Fig. 5 and illustrating a direction reversing mechanism forming part of the drive transmission.

Fig. 9 is a sectional view taken substantially along line 9—9 of Fig. 5, and illustrating the gearing of the reversing mechanism.

Fig. 10 is a fragmentary sectional detail view illustrating the drive transmission in neutral position.

Figure 1:
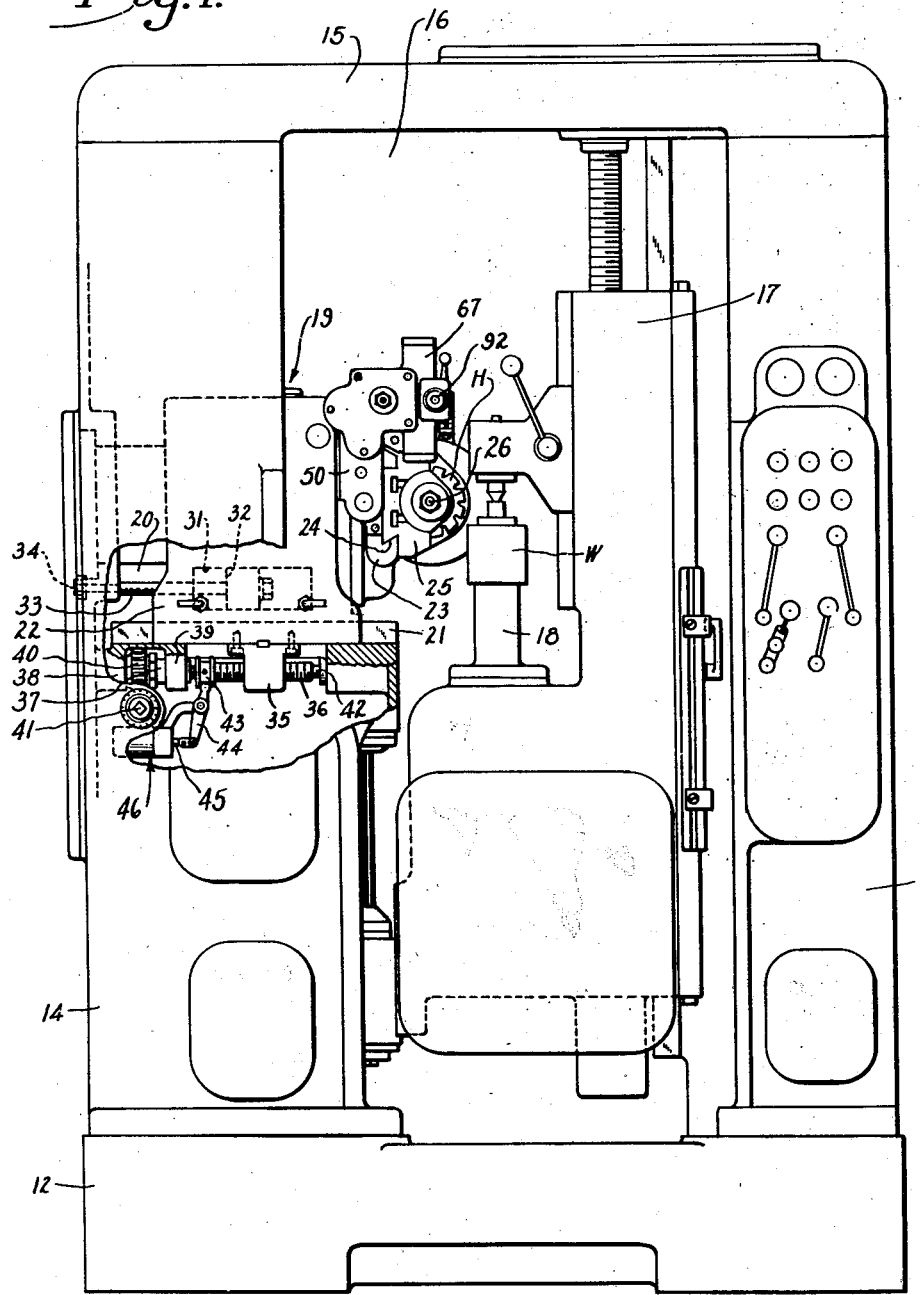
Figure 1 is a front elevational view of a hobbing machine having an automatic hob spindle slide embodying the features of my invention.

Referring more particularly to the drawings, the automatic hob slide constituting the exemplary embodiment of the invention is adapted for use in various types of hobbing machines. For purposes of illustration, the slide is shown as forming part of an automatic hobbing machine of the vertical type comprising a base 12 supporting a right-hand column 13 and a left-hand column 14. Extending across the top of the columns and secured thereto is a bridge 15. The base, the columns and the bridge define a central space or opening 16 in which the operative elements of the machine are disposed, and form a rigid supporting structure that is capable of withstanding, without yielding, the heavy stresses imposed during a cutting operation, such as hobbing.

Mounted for vertical reciprocation on the inner side of the right-hand column 13 is a slide 17 having a vertical work spindle 18 for supporting a work blank W for rotation and axial translation in a program of feed and rapid traverse movements. The drive means for the slide 17 and spindle 18 is not fully disclosed herein, since per se it forms no part of the present invention, but reference may be had to U. S. Letters Patent to Benjamin R. Purvin, No. 2,338,737 for a more complete understanding thereof.

A tool support 19 for a cutting tool or hob H is mounted within the left-hand column 14 in opposed relation to the slide 17 and is reciprocable transversely of the axis of the spindle 18, alternately to advance the hob into cutting position relative to the work W before commencement of the cut, and to retract the hob into an inoperative position remote from the work at the end of the cut. More particularly, the left-hand column 14 has an enlarged recess or opening 20 therein located substantially midway between the base 12 and the bridge 15. Horizontally disposed ways 21, extending inwardly of the opening 20, support a ram or swivel slide 22. A slide swivel 23 is mounted for angular adjustment against the outer end of the slide 22, and is adapted to be clamped in position of adjustment. The outer face of the swivel 23 is formed with a diametrically extending dovetail guideway 24 for adjustably supporting a spindle slide 25. The hob H is fixed on a tool spindle 26 journaled in spaced bearings 27 on the slide 25 with its axis extending longitudinally thereof. Suitable means is provided for driving the hob spindle 26 in timed relation to the work spindle 18, and this means comprises a gear 28 fixed on one end of the spindle. The gear 28 meshes with an elongated gear 29 on a shaft 30 adapted to be driven from a suitable source of power in all positions of angular adjustment of the swivel 23, as more fully disclosed in the aforesaid patent.

Movement of the slide 22 between its retracted and extended positions is preferably effected by hydraulically actuated means (see Fig. 1). Thus, one side wall of the slide is formed with a cylinder 31 paralleling the direction of slide movement. A piston 32 in the cylinder has a rod 33 extending beyond the rear face of the slide and rigidly secured, as indicated at 34, to the left-hand column 14.

Means is provided for adjustably determining the extended or advanced position of the swivel slide 22 and its associated parts. The slide 22 has affixed thereto a depending nut 35 for engagement by a screw 36 disposed in parallelism with the slide ways 21. A tubular shaft 37, rotatably supported in bearing lugs 38 and 39 on the left-hand column 14, is axially alined with one end of the screw 36. A worm gear 40 is keyed to the shaft 37, and meshes with a worm (not shown) on an operating shaft 41. The outer end of the shaft 41 extends through the column 14 (see Fig. 1) for manipulation by the operator to effect rotation of the screw 36.

The limits of slide movement are determined by suitable stops. Thus, the advanced or extended position of the slide 22 is limited by a stop pin 42 mounted on the column for engagement by the free forward end of the screw 36. The retracted position of the slide 22 is determined by the abutment of a shifting stop collar 43, fixed on the screw 36, with the contiguous end of the tubular shaft 37. By rotating the screw 36, and thereby adjusting the position of the slide 22 in relation to the stops 42 and 43, the extended or operative position of the slide is adjusted and predetermined, and incidentally the retracted position is correspondingly adjusted.

As will presently be more particularly described, the advancing and retracting movements of the swivel slide 22 are used to establish certain relationships in the control system. The shifting stop collar 43 is, therefore, arranged to swing a lever 44 which is connected with the stem 45 of a pilot valve 46 (see Figs. 1 and 11). Thus, the valve 46 will be alternately disposed in its two operative end positions as the swivel slide 22 completes its movements respectively into the advanced and retracted positions.

In the normal cycle of the machine, the swivel slide 22 is advanced to locate the hob H in position for cutting engagement with the work W. Assuming that a spur gear is to be cut, the swivel 23 is adjusted to position the hob spindle 26 at an angle to the horizontal in accordance with the lead angle of the hob thread. With the hob H and workpiece W rotating in timed relation, the slide 17 now is elevated first in a rapid approach and then at a feed rate to move the workpiece axially through cutting engagement with the hob. After the workpiece W has passed through the cutting zone, the slide 22 is returned to its retracted position so as to withdraw the hob H out of the path of the workpiece, and thereupon the work slide 17 is returned downwardly at a rapid traverse rate into initial position.

During cutting engagement, the hob H and the workpiece W occupy the relative position shown in Fig. 2. In any one cycle, only a portion of the effective length of the hob H is in cutting engagement with the workpiece W. By shifting the hob axially through a predetermined distance after each cycle, the entire effective cutting length of the hob is brought into use, and consequently hob wear is uniformly distributed and hob life is substantially prolonged. The present invention relates primarily to novel means for effecting automatic axial adjustment of the hob H in a step-by-step shifting movement back and forth through a range substantially equal to its effective cutting length, and such shifting of the hob is effected in the present instance by adjusting the hob spindle slide 25 back and forth along the guideway 24.

The specific means for shifting the spindle slide 25 along the ways 24 (see Figs. 3, 9 and 11) may be of any suitable character. In the present instance, this means comprises an adjusting screw 47 which extends longitudinally between the ways 24. One end of the screw 47 is in threaded engagement with a nut 48 bolted or otherwise suitably fixed to the spindle slide 25. The other end of the screw 47, which may be called the shaft end, has a reduced shaft extension 49 which extends into a casing 50 for connection to a drive transmission (see Fig. 9). This casing is bolted to one end of the slide swivel 23, and the screw 47 is rotatably anchored therein against endwise movement. Preferably, the outer end of the screw shaft 49 is provided with a squared end 51 for the reception of a suitable hand tool.

The power drive transmission for the screw shaft 49 comprises a unidirectional intermittent-motion device, preferably an over-running clutch 52, which is operable by a reciprocatory hydraulic actuator 53 under the control of the swivel slide 22, and which is connected through a reversing mechanism 54 and gearing 55 to the shaft. A stroke-adjusting device 56 is provided for varying the extent of reciprocation of the actuator 53 infinitely from zero to maximum to vary the feed increments imparted to the spindle slide 25. The clutch 52 serves to convert one rectilinear stroke of reciprocation of the actuator 53 into rotary motion. This motion is transmitted in one direction or othe other through the reversing mechanism 54 and gearing 55 to the feed screw 47. Preferably, the various elements of the drive transmission are mounted in or on the casing 50 in compact assembled relation to provide a simple unitary structure adapted to be secured as an attachment to the tool support 19.

The over-running clutch 50, in the particular form disclosed, comprises a driven member 57 mounted on a shaft 58 for rotation therewith and having a plurality of peripherally spaced wedge surfaces 59, a concentric ring gear 60 constituting a driver and having an internal cylindrical surface 61 defining a raceway, and a plurality of wedge elements 62, preferably straight rollers, interposed respectively between the wedge surfaces and the raceway to complete the drive relationship. In the present instance, the driven member 57 is octagonal in form, and thus defines eight wedge surfaces 59 of which any desired member may be utilized. Thus, four of the rollers 62 are shown in operative engagement with a like number of active surfaces 59 alternating with intermediate inactive surfaces. Mounted on the trailing portion of each active surface 59 is a block 63 for backing the associated roller 62. Preferably, the block 63 is formed in the forward side with a V-groove 63$^a$ providing a seat for the roller 62 when the latter is out of wedge locking engagement with the driver 60, and is supported for self-alinement to locate the roller for line contact with the raceway 61. More particularly, the rear side of the block 63 is provided with an arcuate spring 64 slidably engaging in a groove 65 in the periphery of a stop pin 66 secured to the member 57. In operation, when the driver 60 is rotated in a counterclockwise direction (Fig. 5), it will cause the rollers 62 to lock the driven member 57 for rotation therewith. When the driver 60 is rotated in the opposite direction, the rollers 62 will be released from wedge locking engagement so that the member 57 will not be rotated.

The hydraulic actuator 52 may be of any suitable construction, but preferably comprises a vertical cylinder 67 formed integral with the casing 50, and extending transversely of the clutch shaft 58. A long piston 68 is reciprocable in the cylinder 67, and is formed along one side with a longitudinal rack gear 69 meshing with the ring gear 60 of the clutch 52. End plates 70 and 71 are secured to the casing 50 in position to close the opposite ends of the cylinder 67. The plate 70 is formed with a cored passage 72 opening to the contiguous end of the cylinder 67 and adapted for connection to a suitable source of fluid under pressure. Thus, the lower end of the cylinder 67 constitutes an actuating chamber 73 having a pressure area corresponding to the full end area of the piston 68, and effective upon the supply of pressure fluid thereto to move the piston upwardly in a working stroke. Preferably, a sealing cap 74 is secured by a screw bolt 75 to the end face of piston 68. At the other end of the actuator 53, a rod 76 is secured to the inside of the plate 71, and extends slidably into an axial bore 77 in the adjacent end of the piston 68. The rod 76 is formed with an axial passage 78 opening to the bore 77 and adapted for connection to the source of pressure fluid. Thus, the inner end of the bore 77 constitutes an actuating chamber having a relatively small pressure area effective upon the supply of pressure fluid to move the piston 68 downwardly in a return stroke.

The degree of rotation imparted to the shaft 58 through the clutch 52 in each working stroke of the actuator 53 is determined by the length of the stroke, and is subject to infinite adjustment over a range from zero to maximum. In the present instance (see Figs. 5 and 8), the extent of reciprocation is controlled by an adjustable stop 79 which extends into a notch 80 in one side of the piston 68. The notch 80 is formed by cutting a flat surface secantially across one side and intermediate the ends of the piston 68, and opposite sides thereof constitute spaced opposed abutment shoulders 81 and 82 arranged for engagement alternately with opposite sides of the stop 79 to define the end limits of the piston reciprocation. To render the control adjustable, the stop 79 is provided in the form of a triangular block or wedge having side stop faces 83 and 84 inclined oppositely in direction and equally in degree, and arranged for adjustment of the apex transversely of the axis of the piston 68. The abutment shoulders 81 and 82 are relatively inclined equally and oppositely for full surface engagement respectively with the coacting stop faces 83 and 84. The stop member 79 is provided with a supporting slide 85 confined by suitable gib plates 86 for adjustment in spaced parallel guideways 87. These guideways are formed on one side, and extend transversely, of the cylinder 67, and the space therebetween intersects and hence opens to one side of the cylinder bore, and is closed at opposite ends by end plates 88 and 89. An adjusting screw 90 has a shaft 91 extending through the end plate 88 and provided with a hand knob 92. The screw 90 extends between and in parallel relation to the guideways 87, and is in threaded engagement with a fixed nut 93 in the slide 85. A window 86$^a$ is secured between the gib plates 86 to enclose the slide 85.

It will be evident that adjustment of the slide 85 will vary the extent of reciprocation of the piston. Due to the symmetrical tapered form of the stop 79 and groove 80, the midpoint of reciprocation will remain constant, and the limits of reciprocation in opposite directions of movement of the piston 68 will vary equally in accordance with the adjustment of the slide 85. Thus, in the position of the stop 79 shown in full outline (see Fig. 6), a relative wide range of piston movement through distance $a$ is obtained. Upon adjustment of the stop 79 further across the groove 80, for example, into the position indicated in dotted outline, the lost motion therebetween is reduced, and a shorter range of piston movement through distance $b$ is obtained.

The reversing mechanism 54 is incorporated with the over-running clutch 52, and in the preferred form comprises two coaxial gears 94 and 95 located at opposite sides of the driver 60 and adapted for selective drive connection to the clutch outlet shaft 58. The elements of the clutch 52 and reversing mechanism 54 are conveniently maintained in assembled relation between two flanged cover plates 96 and 97 secured in position to close opposite sides of the casing 50. The shaft 58 is slidably and rotatably supported at opposite ends on two opposed and axially alined rods 98 and 99 supported respectively in the cover plates 96 and 97. More particularly, these rods have reduced inner end portions which extend slidably into axial bores 100 and 101 in opposite ends of the shaft 58. The gears 94 and 95 have outwardly projecting hubs supported by anti-friction bearings 102 and 103 housed within the cover plates 96 and 97.

The shaft 58 is utilized as the shiftable element of a reversing clutch for connecting the driven member 57 of the over-running clutch 52 to one or the other of the gears 94 and 95. To this end, the gear hubs are formed with internal toothed clutch elements 105 and 106, and the shaft 58 is formed throughout its length with a peripheral series of longitudinal teeth or serrations 107 slidably splined to the member 57. Thus, the shaft 58 is axially shiftable in the member 57 in opposite directions respectively to engage one end or the other with the clutch elements 105 and 106.

When the shaft 58 is in the intermediate position (see Fig. 10), it is disengaged from both elements 105 and 106, thereby interrupting the power drive, and permitting manual adjustment of the feed screw 47.

To provide means for shifting the shaft or clutch element 58 hydraulically, the rods 98 and 99 are formed with axial passages 108 and 109 which open therethrough to the inner ends of bores 100 and 101, and the outer ends of which are adapted for connection selectively to a source of pressure fluid. Thus, the rods 98 and 99 constitute normally stationary pistons, and the bores 100 and 101 constitute oppositely acting cylinders of a reversible hydraulic actuator.

The gearing for transmitting motion from the reversing clutch 58, 105—106 to the screw shaft 49 (see Figs. 5, 8 and 9) comprises two spur gears 110 and 111 fixed on a shaft 112 journaled at opposite ends in anti-friction bearings 113 within the casing 50. The gear 110 meshes directly with the gear 95, and the gear 111 is connected to the gear 94 through an idler gear 114 (see Figs. 5 and 8). Rotatable on a shaft 115 in the lower portion of the casing 50 is a cluster gear element having a gear 116 in mesh with the gear 110, and a gear 117 in mesh with a gear 118 removably splined on the shaft 49 of the hob slide adjusting screw 47.

Provision is made for automatically clamping the hob slide 25 in position of adjustment during each cutting operation. The clamping means (see Figs. 2 to 4) comprises a series of pressure fluid actuated clamping devices 119 arranged in spaced relation along the guideway 24 to engage the undercut side of a bar 120 bolted to and constituting one of the dovetailed guides on the slide 25. Fluid under pressure is adapted to be supplied to and relieved from the clamping devices 119 in parallel through a manifold block 121 bolted to the top of the slide swivel 23. The clamping devices 119 preferably are alike in construction, and hence a detailed description of one will suffice for all.

Each device 119 comprises a plunger 122 reciprocable in a transverse bore 123 in the slide swivel 23, and having an inclined face on the inner end adapted for engagement with the inclined side of the guide 120. The outer end of the plunger 122 is provided with an enlarged head 124 urged outwardly in an enlargement of the bore 123 by springs 125. A diaphragm 126, secured between the swivel 23 and the manifold 121, overlies the head 124, and is adapted to be acted upon by pressure fluid supplied through an inlet port 127 in the manifold. A groove 128 formed in and extending along the inner surface of the manifold 121 serves to connect the port 127 to the pressure spaces over the respective diaphragms 126.

The hydraulic system (see Fig. 11) for supplying fluid under pressure to the various actuators for the hob slide comprise a pump 129 of suitable construction which is driven by an electric motor 130 and has an inlet line 131 adapted to take a fluid pressure medium such as oil from the supply tank or sump 132. The pump 129 has a pressure discharge line 133 leading to the main control or pilot valve 46 operable by the swivel slide 22.

The control valve 46 is of the reciprocable two-position type operable in opposite end positions to connect two supply lines 134 and 135 respectively and interchangeably to the pump pressure line 133 and an exhaust line 136. The supply lines 134 and 135 are connected to the passages 72 and 78 of the hydraulic actuator 53. It will thus be seen that upon movement of the swivel slide 22 into advanced position to present the hob H to the work W in the cutting cycle of the machine, the valve 46 is adjusted to connect the pump pressure line 133 with the supply line 135, and the drain line 136 with the supply line 134, thereby moving the actuator through a return stroke without imparting a feed to the slide 25. Upon retraction of the swivel slide 22 into inoperative position, the valve 46 is shifted into its other end position of adjustment to connect the line 134 to pressure and the line 135 to drain, thereby effecting movement of the actuator 53 through its working stroke to impart an incremental shift to the slide 25.

The line 135 is connected to the passage 128 of the manifold 121 so that when the slide 22 is shifted into advanced position, the clamps 119 will be applied, and when the slide is returned into the retracted position, the clamps 119 will be released to permit adjustment of the slide 25.

Figure 11:
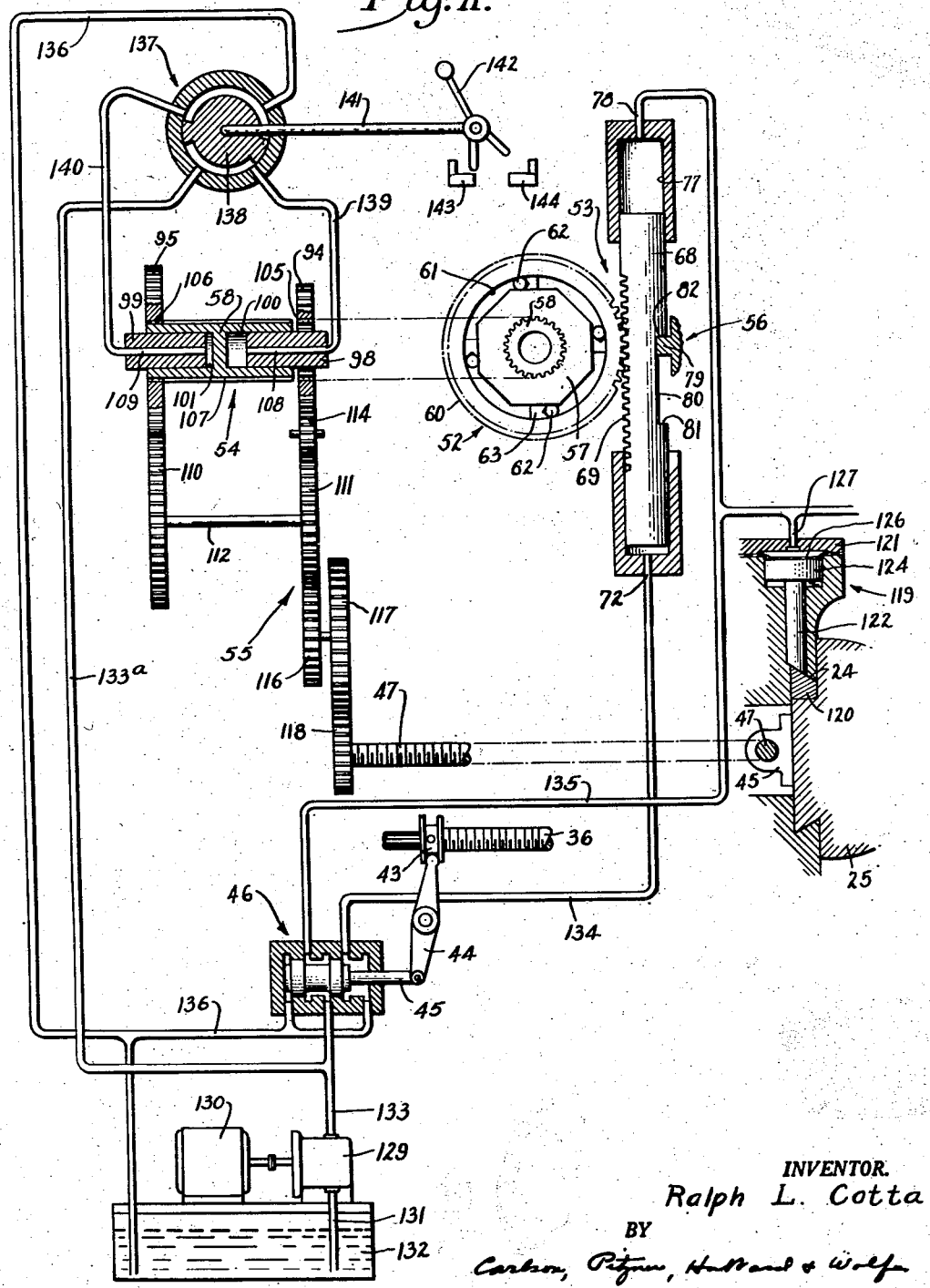
Fig. 11 is a diagrammatic representation of the hydraulic operating and control mechanism for the hob slide.

The reversing mechanism 54 is adapted to be automatically adjusted under the control of a direction valve 137 to change the direction of the incremental feed of the hob slide 25 at each end of travel. In the present instance, the direction valve 137 is of the rotary type having a valve plug 138 and having port connections with a pressure line 133ᵃ branching from the pump line 133, the exhaust line 136, and two supply lines 139 and 140 connected with the passages 108 and 109 opening through the rods 98 and 99 of the hydraulic actuator for the reversing mechanism 54. The valve plug 138 has an operating shaft 141, and a lever 142 on the shaft is alternately engageable by dogs 143 and 144 adjustably mounted on the hob slide 25 to reverse the valve 137 upon movement of the slide into either end position. The port arrangement of the valve 137 is such that in one position, as shown in Fig. 11, the line 140 is connected to the exhaust line 136 and the line 139 is connected to the pressure line 133ᵃ to feed the slide 25 in one direction, and in the other position the connections of the lines 139 and 140 with the lines 136 and 133ᵃ are interchanged to feed the slide in the opposite direction. The line 139 is connected to the passage 108 through an adjusting plug 108ᵃ which may be turned inwardly to constrain the clutch actuating shaft 58 against movement past neutral position in response to pressure fluid supplied through the line 140, thus locating the reversing mechanism 54 in intermediate position to interrupt the drive transmission to the slide 25.

I claim as my invention:

1. An automatic slide comprising, in combination, a support, a spindle mounted on said support for rotary drive and for axial movement through a predetermined range, said spindle being adapted to support a tool for rotation and axial movement therewith, and means operable through an automatic cycle to shift said spindle axially in successive cycles through a series of adjustments within said range, said means comprising a reciprocable hydraulic actuator having a piston with a longitudinal rack gear, a unidirectional overrunning clutch having an oscillatory ring gear meshing with said rack gear, adjusting means for shifting said spindle, a gear transmission including a reversing mechanism for connecting said overrunning clutch to said adjusting means, control means automatically operable in each cycle to reciprocate said actuator through a working stroke and a return stroke, means for adjustably controlling the extent of reciprocation of said piston, and means automatically operable upon movement of said spindle into either end position of said range to reverse said reversing mechanism.

2. An automatic slide comprising, in combination, a support, a spindle mounted on said support for rotary drive and for axial movement through a predetermined range, said spindle being adapted to support a tool for rotation and axial movement therewith, and means operable through an automatic cycle to shift said spindle axially in successive cycles through a series of adjustments within said range, said means comprising adjusting means for shifting said spindle axially, a reversible unidirectional intermittent motion device for operating said adjusting means, and a reciprocable hydraulic actuator including a piston connected to said device for actuating the latter, and stroke adjusting means for limiting the extent of movement of the piston, said last mentioned means comprising a wedge-shaped notch formed in one side of said piston, a wedge-shaped stop projecting into said notch, and means for adjusting said stop in said notch transversely of said piston whereby to vary the opposite limits of movement of said piston while maintaining the midpoint of reciprocation constant.

3. An automatic slide comprising, in combination, a support, a spindle mounted on said support for rotary drive and for axial movement through a predetermined range, said spindle being adapted to support a tool for rotation and axial movement therewith, and means operable through an automatic cycle to shift said spindle axially in successive cycles through a series of adjustments within said range, said means comprising adjusting means for shifting said spindle axially, a reversible unidirectional intermittent motion device for operating said adjusting means, and a reciprocable hydraulic actuator including a piston connected to said device for actuating the latter, and stroke adjusting means for limiting the extent of movement of the piston, said last mentioned means comprising a notch formed in one side of said piston and having oppositely inclined spaced abutment shoulders, a wedge-shaped stop projecting into said slot and having opposite side faces inclined similarly to said shoulders and adapted for engagement thereby to limit the movement of said piston, and means for adjusting said stop in said notch transversely of said piston whereby to vary the opposite limits of movement of said piston.

4. In a hobbing machine having rotary work and hob supporting spindles mounted for movement relative to each other to effect a hobbing operation, the combination of, a support, a slide supporting said hob spindle and mounted on said support for adjustment relative thereto to shift said hob spindle axially, a hydraulic cylinder and a piston reciprocable therein, means providing a one-way connection between said slide and said piston and operable upon the admission of pressure fluid to one end of said cylinder to shift said slide one step, a clamp for locking said slide in said support, a hydraulic actuator communicating with the other end of said cylinder and operable to respectively apply and release said clamp upon the admission of pressure fluid to and the release of such fluid from said actuator, power operated mechanism operable in an automatic cycle of relative movements between said spindles to effect hobbing of a workpiece on said work spindle by a hob on the hob spindle, valve means actuated in response to relative movement between said spindles in said cycle after hobbing of the workpiece to admit pressure fluid to said first mentioned cylinder end to shift said hob spindle and also to release fluid from the other cylinder end and from said clamp actuator whereby to disable said clamp, and valve means responsive to another relative motion between said spindles after completion of the shifting of said hob to admit pressure fluid to said other cylinder end and also to said actuator whereby to apply said clamp.

5. In a hobbing machine having rotary work and hob supporting spindles mounted for movement relative to each other to effect a hobbing operation, the combination of, a support, a slide supporting said hob spindle and mounted on said support for adjustment relative thereto to shift said hob spindle axially, a hydraulic cylinder and a piston reciprocable therein, means providing a one-way connection between said slide and operable by said piston upon the admission of pressure fluid to one end of said cylinder to shift said slide one step, a clamp for locking said slide in said support, a hydraulic actuator communicating with the other end of said cylinder and operable to apply said clamp upon the admission of pressure fluid to the actuator, power operated mechanism operable in an automatic cycle of relative movements between said spindles to effect hobbing of a workpiece on said work spindle by a hob on the hob spindle, valve means actuated in response to relative movement between said spindles to admit pressure fluid to said first mentioned cylinder end to shift said hob spindle, and valve means responsive to a subsequent relative motion between said spindles to admit pressure fluid to said other cylinder end and also to said actuator whereby to apply said clamp.

6. In a hobbing machine having rotary work and hob supporting spindles mounted for movement relative to each other to effect a hobbing operation, the combination of, a support, a slide supporting said hob spindle and mounted on said support for adjustment relative thereto to shift said hob spindle axially, mechanism for shifting said slide comprising a hydraulic cylinder, a piston reciprocable therein, and a one-way connection between said slide and said piston operable upon the admission of pressure fluid to one end of said cylinder to shift said slide one step, said hob shifting mechanism being reconditioned for operation by the admission of pressure fluid to the other end of said cylinder, a stop positioned to limit the extent of shift of said slide by the piston, said stop being selectively adjustable to vary the extent of movement of the hob shift, power operated mechanism operable in an automatic cycle of relative movements between said spindles to effect hobbing of a workpiece on said work spindle by a hob on the hob spindle, a valve having a member movable into first and second positions to admit pressure fluid to said first and second cylinder ends respectively, and mechanism actuated by relative movement between said spindles in opposite directions and operable to shift said valve member into said first position after hobbing of the workpiece in said cycle and into said second position before the initiation of the hobbing action in the next cycle.

RALPH L. COTTA.

(References on following page)

REFERENCES CITED

The following references are of record in the file of this patent:

UNITED STATES PATENTS

| Number | Name | Date |
|---|---|---|
| 1,140,610 | Reinecker | May 25, 1915 |
| 2,122,219 | Staples | June 28, 1938 |
| 2,167,267 | Purvin | July 25, 1939 |
| 2,210,134 | Staples | Aug. 6, 1940 |
| 2,251,016 | Gallimore | July 29, 1941 |
| 2,355,677 | Ransome | Aug. 15, 1944 |

FOREIGN PATENTS

| Number | Country | Date |
|---|---|---|
| 331,343 | Great Britain | July 3, 1930 |